United States Patent [19]

Alberino et al.

[11] Patent Number: 4,772,658
[45] Date of Patent: Sep. 20, 1988

[54] LOW VISCOSITY COPOLYMER POLYISOCYANATES

[75] Inventors: Louis M. Alberino, Cheshire; John W. Reisch, Guilford, both of Conn.

[73] Assignee: The Dow Chemical Company, Midland, Mich.

[21] Appl. No.: 121,185

[22] Filed: Nov. 16, 1987

[51] Int. Cl.$^4$ ............................................. C08L 35/04
[52] U.S. Cl. ..................................... 524/728; 524/714; 525/126
[58] Field of Search ................ 524/728, 714; 525/126

[56] References Cited

U.S. PATENT DOCUMENTS

| | | | |
|---|---|---|---|
| 3,422,165 | 1/1969 | Brotherton et al. | 260/859 |
| 3,968,089 | 7/1976 | Cuscurida et al. | 260/859 |
| 4,283,500 | 8/1981 | Armstrong et al. | 521/137 |
| 4,332,716 | 6/1982 | Shah | 521/137 |
| 4,695,596 | 9/1987 | Berkowitz | 521/137 |

FOREIGN PATENT DOCUMENTS 1447273  8/1976  United Kingdom .

Primary Examiner—Maurice J. Welsh
Attorney, Agent, or Firm—J. S. Rose

[57] ABSTRACT

Disclosed are novel polymer/polyisocyanate compositions. The compositions are prepared by the in-situ polymerization of at least one ethylenically unsaturated monomer in an organic polyisocyanate and in the presence of an adduct formed from the reaction of an excess of a carbodiimide-free polyisocyanate and a hydroxyl containing ethylenically unsaturated monomer.

The graft polyisocyanates find particular utility in the making of molded polyurethane resins.

22 Claims, No Drawings

LOW VISCOSITY COPOLYMER POLYISOCYANATES

FIELD OF THE INVENTION

This invention relates to polyisocyanates and is more particularly concerned with polymer/polyisocyanate compositions and polymers derived from their polymerization with active hydrogen containing materials.

DESCRIPTION OF THE PRIOR ART

The technology of polymerizing ethylenically unsaturated monomers in-situ in organic polyisocyanates has been known for some time. For example, U.S. Pat. No. 3,422,165 discloses polymer/polyisocyanate compositions wherein ethylenically unsaturated monomers are polymerized to the extent of 1 to 90 weight percent content in the isocyanate. The utility of such polymer/polyisocyanates has already been established in respect of the increased load-bearing abilities and tensile properties of the polyurethanes produced therefrom. Similar polymer/polyisocyanate compositions appear in the disclosure of British Patent No. 1,447,273 although at lower polymer concentrations than U.S. Pat. No. 3,422,165.

As an alternative means for introducing graft type polymers into polyurethane systems, U.S. Pat. No. 3,968,089 teaches the procedure of first preparing an isocyanate terminated prepolymer from a polyether polyol and excess polyisocyanate and then polymerizing an ethylenically unsaturated monomer therein.

U.S. Pat. No. 4,283,500 provides a selection over U.S. Pat. No. 3,422,165 cited supra by disclosing the specific employment of acrylonitrile alone or in admixture with one or more ethylenically unsaturated monomers in-situ with a specific type of diarylalkylene diisocyanate component. Highly stable dispersions are disclosed in U.S. Pat. No. 4,332,716 when at least one ethylenically unsaturated monomer is polymerized in-situ in a blend of polyisocyanate with a stabilizer consisting of a polyoxyalkylene polyol or an isocyanate terminated prepolymer.

More recently U.S. Pat. No. 4,695,596 has disclosed polymer/polyisocyanate dispersions prepared by the in-situ polymerization of ethylenically unsaturated monomers in the polyisocyanate along with macromolecular monomers. The latter materials are described as vinyl terminated polystyrene compounds of molecular weight from 500 to 100,000. These materials where commercially available are expensive and are more suited to the low viscosity polyisocyanates such as toluene diisocyanate.

Generally speaking, many of the prior disclosed polymer/polyisocyanate compositions give rise to polyurethane products of improved modulus, tensile, or load-bearing strengths, but the overall viscosities of these compositions are high even at low polymer content (e.g. 15 to 20 percent by weight).

Accordingly, it is highly desirable to provide a polymer/polyisocyanate dispersion composition which is characterized by a relatively low viscosity even with the more viscous polyisocyanates and at a polymer concentration of 25 percent by weight or higher in the isocyanate. This would be a new polymer/polyisocyanate composition with improved or different structure. Furthermore, it would be just as desirable to provide such a new material via a simple and facile process.

SUMMARY OF THE INVENTION

The present invention is directed to improved liquid polymer/polyisocyanate dispersion compositions prepared by the in-situ polymerization of at least one ethylenically unsaturated monomer in an organic polyisocyanate wherein the improvement comprises carrying out said in-situ polymerization in the presence of a minor amount of an adduct prepared by the reaction of an excess of a carbodiimide-free organic polyisocyanate and a hydroxyl containing ethylenically unsaturated monomer.

The present invention is also directed to the process for preparing said liquid polymer/polyisocyanate dispersions.

The present invention is also directed to the molded polymers prepared from the reaction in a mold of said liquid polymer/polyisocyanate dispersions with mixtures comprising an organic polyol, an extender, and, optionally, a catalyst.

The term "dispersion" as used throughout the specification and claims means dispersions wherein the disperse phase (polymer) can include liquids or solids dispersed in the continuous phase (polyisocyanate) as well as true solutions wherein the disperse phase can be present as a true solution. Generally speaking, the disperse phase can include colloidal size particles.

Surprisingly, the polyisocyanate compositions of this invention are characterized by excellent stability in addition to low viscosities even at polymer concentrations in excess of 25 percent by weight. In view of the prior art, particularly U.S. Pat. No. 4,283,500 cited supra, it is quite unexpected to find the present low viscosity values at the levels of dispersed polymer. It will be noted that in some cases the reference discloses the polyisocyanate compositions as gelling or solidifying (see runs f, g, and h of Table 3 of the reference) or at least of high viscosity when polymer concentrations exceed 20 percent by weight.

The polymer/polyisocyanates find the same utility as other organic polyisocyanates known to those skilled in the art. This includes the manufacture of polyurethane foams, coatings, molded articles, and the like.

DETAILED DESCRIPTION OF THE INVENTION

The liquid polymer/polyisocyanate dispersion compositions in accordance with the present invention are readily prepared using the procedures described in the patents cited supra for disclosing the in-situ polymerization of ethylenically unsaturated monomers in organic polyisocyanates except for the novel step described hereinbelow. In this connection, U.S. Pat. Nos. 3,422,165; 3,968,089; 4,283,500: and 4,332,716 whose disclosures with respect to the methods, techniques, and ingredients for polymerizing ethylenioally unsaturated monomers in polyisocyanates are incorporated herein by reference.

The novelty in the present compositions resides in carrying out the in-situ polymerization in the presence of the adduct defined above. The adduct must be preformed by reacting the hydroxyl component with the carbodiimide-free polyisocyanate prior to an in-situ polymerization. While the choice of polyisocyanate for the latter step is not limited to being carbodiimide-free, simultaneous addition of the hydroxyl bearing ethylenic monomer along with the main polymerizing ethylenic monomer, regardless of polyisocyanate type, will not result in the desired products of this invention.

The adduct is simply the product of reacting a monofunctional hydroxyl bearing ethylenically unsaturated monomer with the isocyanate, or, simply, the urethane reaction product. It is referred to hereinafter as an adduct or vinylized adduct because of the presence of the ethylenic double bond.

Its preparation is readily carried out using any of the well known urethane forming procedures known to those skilled in the art. The mode of addition is in no way critical so that the isocyanate may be added to the hydroxyl component or vice versa. Because the volume of isocyanate is, for the most part, larger than its co-reactant it is more convenient to add the hydroxyl reactant to the isocyanate either all at once or incrementally depending on reactant temperatures. It is preferable to employ elevated temperatures, for example, from about 25° C. to about 150° C., most preferably from about 40° C. to about 75° C. Exclusion of moisture from the reaction site is desirable in view of the reactivity of isocyanate groups with moisture. Accordingly, it is preferred to mix the reactants in an inert atmosphere such as nitrogen, argon, and the like. The reaction mixture is stirred and heated until all of the hydroxyl groups have been consumed. The actual time will vary considerably depending on the reactivity of the isocyanate groups per se, reaction temperature, and the like. Completion of the reaction is measured using any of the appropriate analytical procedures known to those skilled in the art for determining the presence of hydroxyl groups, or, for the hydroxyl bearing ethylenic monomer as a whole; for example, infrared spectroscopy, vapor phase chromatography, gel permeation chromatography, high pressure liquid chromatography, and the like. No isolation or purification steps are required and the adduct can be employed directly in the in-situ polymerization.

The carbodiimide-free polyisocyanate must be in excess. The excess employed is sufficient to provide the final polymer/polyisocyanate compositions in the fluid state even at a polymer concentration in excess of 25 percent by weight. The term "fluid state" means having a viscosity of less than about 15,000 cps (determined at 25° C.), preferably less than 10,000 cps, and, most preferably, less than 5,000 cps when determined at a polymer concentration of 25 percent by weight. The optimum proportions for any given combination will vary somewhat depending on the reactants but in all cases are readily determined by simple trial experiments. Advantageously, the hydroxyl bearing monomer is employed within a range of from about 0.01 to about 0.2 equivalent, preferably from about 0.03 to about 0.1 equivalent per equivalent of said carbodiimide-free polyisocyanate.

The hydroxyl monomer in its broadest scope includes any organic compound having at least one polymerizable aliphatic ethylenic double bond and a single hydroxyl group. Included in this definition are allyl alcohol, allyl esters of hydroxy substituted carboxylic acids selected from (a) aliphatic carboxylic acids having 2 to 8 carbon atoms; (b) aromatic carboxylic acids having 6 to 18 carbon atoms; and (c) cycloaliphatic carboxylic acids having 5 to 9 carbon atoms, vinyl esters of the same hydroxy substituted carboxylic acids defined under (a) through (c) above, esters of acrylic and methacrylic acids having the formulae $CH_2=CHCOOROH$ or $CH_2=C(CH_3)COOROH$ wherein R represents alkylene of 1 to 8 carbons, arylene of 6 to 18 carbons, and cycloalkylene of 5 to 7 carbons, and the acrylamide and methacrylamide compounds having the formulae $CH_2=CHCONHROH$ or $CH_2=C(CH_3)CONHROH$ wherein R has the same significance defined above for the esters. These monomers can be substituted with an inert group meaning any group not reactive with isocyanate, hydroxyl, and ethylenic unsaturation, or will not otherwise interfere with the present compositions and process therefor. Included in such inert substituents are alkyl of $C_1$ to $C_8$, halogen such as fluorine, chlorine, bromine, or iodine, alkoxy of $C_1$ to $C_8$, nitro, cyano, and the like.

Preferred as a class are the esters of acrylic and methacrylic acids defined above. Most preferred are the hydroxyalkyl esters wherein R represents $C_1$ to $C_8$ alkylene. Even more preferred are those wherein R is $C_2$ to $C_4$ alkylene.

Illustrative but not limiting thereof are allyl alcohol, allyl hydroxyacetate, allyl-2-hydroxypropionate, allyl-3-hydroxybutyrate, allyl-2-hydroxyethylhexanoate, allyl-4-hydroxybenzoate, allyl-3-hydroxycyclopentane carboxylate, and the like; vinyl hydroxyacetate, α-methylvinyl hydroxyacetate, vinyl-2-hydroxypropionate, α-methylvinyl-2-hydroxypropionate, vinyl-3-hydroxybutyrate, vinyl-4-hydroxybenzoate, α-methylvinyl-4-hydroxybenzoate, vinyl-4-hydroxycyclohexane carboxylate, and the like: hydroxymethyl acrylate, 2-hydroxyethyl acrylate, 2-hydroxypropyl acrylate, 3-hydroxypropyl acrylate, 4-hydroxybutyl acrylate, 5-hydroxyamyl acrylate, 6-hydroxyhexyl acrylate, 7-hydroxyheptyl acrylate, 8-hydroxyoctyl acrylate, 4-hydroxyhexyl acrylate, 4-hydroxyphenyl acrylate, 3-hydroxyphenyl acrylate, 3-hydroxy-4-methylphenyl acrylate, 2-hydroxycyclopentyl acrylate, 3-hydroxycyclohexyl aorylate, 4-hydroxycyclohexyl acrylate, hydroxymethyl methacrylate, 2-hydroxyethyl methacrylate, 3-hydroxypropyl methacrylate, 4-hydroxybutyl methacrylate, 5-hydroxyamyl methacrylate, 6-hydroxyhexyl methacrylate, 7-hydroxyheptyl methacrylate, 8-hydroxyoctyl methacrylate, 4-hydroxyphenyl methacrylate, 2-hydroxycyclopentyl methacrylate, 4-hydroxycyclohexyl methacrylate, and the like; N(hydroxymethyl)acrylamide, N(2-hydroxyethyl)acrylamide, N(4-hydroxybutyl)acrylamide, N(5-hydroxyamyl)acrylamide, N(4-hydroxyphenyl)acrylamide, N(4-hydroxycyclohexyl)acrylamide, N(hydroxymethyl)methacrylamide, N(2-hydroxyethyl)methacrylamide, N(4-hydroxybutyl)methacrylamide, N(4-hydroxyphenyl)methacrylamide, N(4-hydroxycyclohexyl)methacrylamide, and the like.

Preferred of the exemplified species above are the acrylates and methacrylates and, particularly those wherein the esterifying radical R is alkylene.

It is essential that the polyisocyanate for the adduct be carbodiimide-free. This would exclude those polyisocyanates which have been treated with carbodiimide forming catalysts for the purpose of making them liquid. Such liquefied materials contain equilibrium amounts of uretoneimine groups arising from the cyclization between carbodiimide linkages and other isocyanate groups. In the event such polyisocyanates are used and the resulting adduct employed in the in-situ polymerization, the compositions obtained are of excessive viscosity or else will solidify.

With the above exception, any other di- or higher functionality polyisocyanate known in the art can be employed. This includes aliphatic, aromatic, and cycloaliphatic polyisocyanates. The preferred class comprises the aromatic polyisocyanates. Illustrative of the polyisocyanates but not limiting thereof are hexamethylenediisocyanate, isophoronediisocyanate, methylenebis(cyclohexyl isocyanate), m- and p-phenylene diisocyanate, 2,4- and 2,6-toluene diisocyanate and mixtures of these two isomers, methylenebis(phenyl isocyanate) inclusive of 4,4'-methylenebis(phenyl isooyanate), 2,4'-methylenebis(phenyl isooyanate), and mixtures of these methylenebis(phenyl isocyanate) isomers in any proportion, 3,3'-dimethyl-4,4'-diisocyanatodiphenyl methane, polymethylene polyphenylisocyanate mixtures comprising about 20 to about 80 percent methylenebis(phenyl isocyanate) with the remainder of the mixture being polyisocyanates of functionality greater than 2, liquefied forms of methylenebis(phenyl isocyanate) particularly liquefied forms (including mixtures containing up to about 30 percent of the 2,4'-isomer) of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof: isocyanate terminated prepolymers having an isocyanate content of about 9 to about 20 percent by weight prepared from methylenebis(phenyl isocyanate) and a polyol having a functionality from 2 to 3 selected from polyalkyleneoxy polyols of molecular weight 1000 to 10,000, polytetramethylene glycols of molecular weight 600 to 5000, and polyester polyols of molecular weight 500 to 8000, said polyol and said methylenebis(phenyl isocyanate) being reacted in the proportions of about 0.01 equivalent to about 0.5 equivalent of said polyol per isocyanate equivalent.

Preferred of the polyisocyanates set forth above are the aromatic isocyanates and most preferred are those polymethylene polyphenyl isocyanate mixtures defined above.

The use of a urethane catalyst for the adduct preparation is purely optional. Whether one is employed or not is without effect on the final compositions. While speeding up the hydroxyl/isocyanate interaction, there are those cases where either for economic or practical considerations the use of catalyst is not desirable. If it is desired to achieve the fastest formation of the adduct at the lowest temperatures possible, then any of the urethane catalysts disclosed in the art can be employed. Such catalysts include organic and inorganic acid salts of, and organometallic derivatives of bismuth, tin, lead, antimony, cobalt, and the like. A preferred group includes stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isooctyl thioglycolate) and the like, triethylamine, triethylenediamine, N,N,N',N'-tetramethylethylenediamine, -methylmorpholine, N,N-dimethylcyclohexylamine, and the like, and mixtures of any of the above.

Catalytic amounts are employed advantageously within a range of from about 0.01 percent to about 2 percent by weight, preferably from about 0.05 to about 1 percent of the weight of hydroxy compound and polyiso- cyanate.

As noted previously, the polymer/polyisocyanate compositions of this invention are prepared using the techniques and ingredients in the patents cited supra whose disclosures are already incorporated herein. It remains to select the optimum proportion of vinylized adduct which must be included during the in-situ polymerization. The specific range of proportions within which the adduct can be employed will vary depending on the solubility or hydrophobicity of the adduct in the polymerizing medium. For example, the alkylene carbon content of an acrylate or methacrylate esterifying group will have an influence on the optimum proportions. Generally speaking, the proportion selected is such that it is sufficient to result in the same fluidity requirements set forth above for a minimum of 25 percent by weight polymer content, i.e. less than 15,000 cps (at 25° C.) viscosity when discussing adduct preparation. It should be understood that reference to a 25 percent by weight of polymer concentration in the final composition does not include any possible polymer product which may arise from the vinyl polymerization of the ethylenic bonds in the adduct itself.

Advantageously, the vinylized adduct is employed at the level of from about 2 to about 25 percent of the total weight of adduct, polymer, and polyisocyanate combined. Preferably the adduct is employed within a range of from about 5 to about 15 percent by weight.

The adduct, at least one ethylenically unsaturated monomer, organic polyisocyanate, and vinyl polymerization catalyst can be mixed in any order to effect the in-situ polymerization of the monomer in the mixture. Preferably, the polymerization is performed under the exclusion of atmospheric air and moisture. This is most advantageously achieved by operating under an inert atmosphere such as nitrogen, or argon. Optionally, and, preferably the adduct and polyisocyanate are mixed together initially and heated during rapid agitation to a preselected reaction temperature. The ethylenically unsaturated monomer can be premixed with the catalyst and a minor portion of the blend, for example 2 to 20 percent by weight, can be added slowly to the hot polyisocyanate reactant. Use of this technique allows the polymerization to initiate slowly under better control compared with addition of the whole concentration of polymerizing monomer. Following the initial addition, the remaining bulk of the monomer and catalyst can be added at such a rate to maintain reasonable reaction temperature.

The overall polymerization temperature falls within a temperature range of from about 25° C. to about 200° C. in the presence of a free radical initiating catalyst, and, preferably within about 45° C. to about 150° C. The polymerization is continued until all of the monomer has been consumed. This is readily determined by employing conventional analytical methods on aliquot samples of the reaction mixture: for example, thin layer chromatography, vapor phase chromatography, infrared spectroscopy, and the like.

In an optional embodiment, the polymerization can be carried out in an inert organic solvent which will not react with isocyanate, monomer, or catalyst, nor otherwise interfere with the course of the polymerization. Illustrative of such solvents are benzene, toluene, ethyl acetate, acetonitrile, dichlorobenzene, hexane, heptane, cyclohexane, dioxane, methyl isobutyl ketone, dimethylformamide, dimethylacetamide, and the like.

The catalyst concentration can be used in the range of from about 0.01 to about 5 percent by weight based on the total weight of the whole composition inclusive of vinylized adduct, monomer, and polyisocyanate. Any free radical producing catalysts, or other catalysts capable of inducing and sustaining vinyl polymerization can be employed. Illustrative but not limiting of the catalysts are the peroxides such as hydrogen peroxide, dibenzoyl peroxide, acetyl peroxide, benzoyl hydroperoxide, t-butyl hydroperoxide, di-t-butyl peroxide, lauroyl peroxide, butyryl peroxide, dicumyl peroxide and the like: azo compounds such as azo-bis(isobutyronitrile) and the like; the per compounds such as the persulfates, percarbonates, perborates, etc., for example, persuccinic acid, diisopropyl peroxydicarbonate, t-butyl perbenzoate, di-t-butyl diperphthalate, peracetic acid, and the like.

The preferred catalysts are those having the azo linkage such as azo-bis(isobutyronitrile).

In a most preferred embodiment, in addition to the free radical initiating catalyst there is employed a catalytic proportion of iodine. This is similar to the process disclosed in U.S. Pat. No. 4,574,137 wherein a catalytic proportion of iodine is employed during the in-situ polymerization of ethylenic monomers in organic polyols to form graft polyols. Advantageously, the iodine is employed within the proportions of from about 0.1 to about 2 percent by weight based on the total composition weight.

The ethylenic monomers used in the present compositions can be any one of those organic compounds having at least one polymerizable ethylenic double bond. Such monomers include hydrocarbon monomers, meth(acrylonitrile), (meth)acrylic monomers inclusive of (meth)acrylic esters and (meth)acrylamides, vinyl esters, vinyl halides, vinyl ethers, vinyl ketones, and the like. A preferred group includes (meth)acrylonitrile, (meth)acrylic monomers, vinyl halides, and mixtures thereof.

Illustrative but not limiting thereof are monomers such as butadiene, isoprene, 1,4-pentadiene, 1,6-hexadiene, 1,7-octadiene, styrene, alpha-methylstyrene, methylstyrene, dimethylstyrene, ethylstyrene, isopropylstyrene, butylstyrene, phenylstyrene, cyclohexylstyrene, benzylstyrene, and the like: substituted styrenes such as chlorostyrene, bromostyrene, fluorostyrene, trifluoromethylstyrene, iodostyrene, cyanostyrene, nitrostyrene, N,N-dimethylaminostyrene, acetoxystyrene, phenoxystyrene, and the like: the acrylic and substituted acrylic monomers such as methyl acrylate, ethyl acrylate, allyl acrylate, methyl methacrylate, methacrylic anhydride, acrylic anhydride, cyclohexyl methacrylate, benzyl methacrylate, isopropyl methacrylate, octyl methacrylate, acrylonitrile, methacrylonitrile, acrylamide, methacrylamide, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, alpha-chloroacrylonitrile, N,N-dimethylacrylamide, N,N-dibenzylacrylamide, N-butylacrylamide, methacrylyl formamide, and the like: the vinyl esters, vinyl halides, vinyl ethers, vinyl ketones, etc. such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl chloride, vinyl bromide, vinyl fluoride, vinylidene chloride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like.

A particular preferred group of monomers includes acrylonitrile, acrylonitrile in combination with a minor proportion (2 to 10 percent by weight) of acrylamide, vinylidine chloride, the acrylate esters of methyl, ethyl, propyl, butyl, amyl hexyl, heptyl, octyl, and 2-ethylhexyl acrylate provided the latter four alkyl acrylates are employed in combination with at least 10 percent by weight of a hydroxyalkyl acrylate of the type defined above for the adduct preparation, preferably 10 to 20 percent of hydroxyethyl acrylate. This latter provision is to ensure that the polymer/polyisocyanate dispersion compositions prepared with the more hydrophobic acrylate polymers do not tend to separate into separate layers.

The amount of polymer in percent by weight based on the total combined weight of polymer, polyisocyanate, and adduct can fall within a broad range, for example, from about 5 to about 75 percent by weight. However, to achieve the minimum viscosities obtainable for the compositions, it is preferable that they contain from about 5 to about 40 percent by weight, most preferably, from about 10 to about 30 percent by weight. It should be noted that these percentages do not include any polymer weight which might, and, most probably does, arise from the vinyl polymerization of the ethylenic unsaturation present in the preformed adduct. This exclusionary provision was noted above in the discussion of the broad and preferred viscosity values for the present compositions as measured at 25 percent by weight polymer concentration.

In respect of the polyisocyanate employed for the in-situ polymerization, this includes the same polyisocyanates with the preferences discussed above for the preparation of the adduct. However, there is additionally included this time those polyisocyanates which do contain the carbodiimide and/or uretoneimine linkages, particularly for the purpose of liquefying the polyisocyanate. The preferred polyisocyanates are the aromatic ones and particularly preferred are the carbodiimide containing methylenebis(phenyl isocyanates) based on liquefied 4,4'-and and mixtures with up to about 30 percent 2,4'-isomer of methylenebis(phenyl isocyanates) having equivalent weights of from about 130 to about 180.

As noted previously, the present compositions have surprisingly low viscosities even at levels of 25 percent by weight polymer concentration. This is in stark contrast to similar prior art compositions which have much higher viscosities at lower polymer concentrations. In some cases the prior art compositions actually solidify. Additionally, the present compositions enjoy remarkable long term stability in respect of the polymer dispersions. The only time separation does tend to occur is when the more hydrophobic type acrylate esters are employed. And this is readily cured by employing minor proportions of hydroxyl containing co-monomer reactants as discussed above and shown by the examples hereinbelow.

The present polyisocyanate compositions can be employed in the same utilities as practiced with the prior art polymer/polyisocyanate compositions and organic polyisocyanates in general. Because the present compositions have such fluidity and low viscosities, this renders them particularly useful in machine processing as in the reaction injection molding of polyurethanes. Additionally, the compositions achieve their low viscosities notwithstanding the higher levels of reinforcing polymer over the art. Accordingly, the molded polyurethanes prepared therefrom are characterized by high flexural strength and modulus and high tensile strength. The increase in polymer content in the isocyanate has a similar overall effect as increasing the hard segment content of the resulting polyurethane.

The production of synthetic polyurethanes in accordance with this invention using the present polymer/polyisocyanates are carried out using any of the methods well known to those skilled in the art in respect of polyurethane formation. For general teaching and preparative methods see Saunders and Frisch, *Polyurethanes: Chemistry and Technology*, Parts I and II, 1962 and 1964, respectively, John Wiley and Sons, New York, N.Y. For the production of molded polyurethanes, and particularly RIM polyurethanes, see U.S. Pat. Nos. 4,296,212, 4,374,210, and 4,472,341. The disclosures of these three patents in respect of the procedures and ingredients employed are hereby incorporated herein by reference.

The key step over the prior art is the employment of the liquid polymer/polyisocyanate compositions described above as the major polyisocyanate component. Conventional organic polyisocyanates may be used in combination with the present novel polyisocyanate compositions provided they be present in proportions no greater than 20 percent by weight of the total polyisocyanate component. In the main, the present polyurethane polymers are prepared from the reaction in a mold of a mixture comprising an organic polyol, an extender, and a liquid polymer/polyisocyanate dispersion composition as hereinabove defined.

A preferred polyurethane of this invention comprises the reaction in a mold of (A) the polymer/polyisocyanate composition: (B) an organic polyol having a molecular weight from about 1500 to about 12,000 and a functionality of from about 2 to about 6; (C) an extender: and (D) a polyurethane catalyst wherein the equivalent proportions of said polyol (B) to said extender (C) is within the range of about 1:1 to about 1:20 (preferably 1:4 to 1:10) and the ratio of isocyanate equivalents of (A) to the total active hydrogen equivalents of said (B) and (C) is from about 0.95 to about 1.5 (preferably 0.95 to 1.15).

The preferred polymer/polyisocyanates for the polyurethanes preparation carry the same preferences set forth above in the discussion of the polymer/polyisocyanates.

The polyol component (B) in accordance with the present invention and defined above can be any of the polyols well known to those skilled in the polyurethane art and which fall within the above definition. Primarily, the choice of polyol functionality and molecular weight will depend on the specific polymer properties required and the type of polyol employed. Generally speaking, the preferred functionality will be from about 2 to about 4 and the preferred molecular weight range of from about 2000 to about 8000, with a most preferred range of about 2000 to about 6000.

Illustrative, but not limiting, of the classes of polyols which can be used are the polyoxyalkylene polyethers; polyester polyols, polyol adducts derived from ethylene oxide and methylenedianiline and polymethylene polyphenylamine mixtures (in accordance with U.S. Pat. No. 3,499,009): polyols obtained by the Mannich condensation of a phenolic compound with formaldehyde, an alkanolamine, and ethylene oxide (in accordance with U.S. Pat. No. 3,297,597): vinyl reinforced polyether polyols, e.g. by the polymerization of styrene or acrylonitrile in the presence of the polyether: polyacetals prepared from glycols such as diethylene glycol and formaldehyde: polycarbonates, for example those derived from butanediol with diarylcarbonates: polyester amides; the resole polyols (see *Prep. Methods of Polymer Chem.* by W. R. Sorenson et al., 1961, page 293, Interscience Publishers, New York, N.Y.); and the polybutadiene resins having primary hydroxyl groups (see *Poly Bd. Liquid Resins*, Product Bulletin BD-3, October 1974, Arco Chemical Company, Div. of Atlantic Richfield, New York, N.Y.).

A preferred group of polyols comprises the propyleneoxy-polyethyleneoxy capped diols and triols obtained by the alkoxylation of water, ammonia, ethylene glycol, propylene glycol, trimethylolpropane, aniline, ethanolamine, and the like; the polyester diols obtained from the reaction of dibasic carboxylic acids such as succinic, adipic, suberic, azelaic, phthalic, isophthalic, and the like with alkylene glycols, and oxyalkylene glycols to form the corresponding polyalkylene, and polyoxyalkylene ester diols or copolymers thereof: and the vinyl-resin reinforced propyleneoxy-ethyleneoxy capped diols and triols, particularly those polyethers reinforced with polyacrylonitrile.

The extender (C) can be a low molecular weight extender of from about 62 to about 400. Typical of such extenders are ethylene glycol, 1,4-butanediol, 1,6-hexanediol, 1,4-cyclohexanedimethanol, neopentyl glycol, bis(2-hydroxyethyl)ethers of hydroquinone and resorcinol, hexamethylene diamine, octamethylene diamine, 2,4-diaminotoluene, 2,6-diaminotoluene, 4,4'-diamino-3,3'-dichlorodiphenylmethane, 2,4-diamino-3,5-diethyl toluene, 2,6-diamino-3,5-diethyl toluene, and mixtures of two or more of any of the above.

In respect of catalyst (D), any of those conventionally employed in the art to catalyze the reaction of an isocyanate with a reactive hydrogen containing compound can be employed for this purpose: see, for example, Saunders et al., *Polyurethanes, Chemistry and Technology*, Part I, Intersoience, New York, 1963, pages 228–232; see also, Britain et al., *J. Applied Polymer Science*, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isoctylthioglycolate), and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, N,N-dimethylcyclohexylamine, and the like, and mixtures of the above in any combination.

The preferred catalysts are the organo metallic compounds and particularly the dialkyl tin salts such as the dibutyltin compounds noted above.

The amount of catalyst employed will vary considerably according to the particular extender mixtures in the polymer forming mixture and the particular catalyst involved. Optimum catalyst concentration is easily determined using trial and error tests by one skilled in the art. Generally speaking, the catalyst or mixture of catalysts will be employed within a range of from about 0.01 percent by weight to about 5.0 percent by weight, preferably from about 0.02 to about 3.0 percent, based on the total weight of isocyanate, polyol and extender mixture.

Optionally, blowing agents may be employed even in the production of molded polyurethanes wherein compact tough skinned surfaces are desired. Any of the blowing agents known to those skilled in the art can be used including water and fluorocarbon blowing agents. The latter are preferred and generally are halogenated aliphatic hydrocarbons which can be also substituted by chlorine and/or bromine in addition to the fluorine content.

Also, inert gases (e.g. nitrogen) may be introduced at the polymer forming stage to provide whatever degree of blowing is desired from microcellular to macrocellular in nature.

Other optional additives such as dispersing agents, internal mold release agents, cell stabilizers, surfactants, flame retardants, colorants, and the like can be added to the polyurethane polymers in accordance with the present invention.

The polymers produced in accordance with the present invention are characterized by the excellent properties of impact strength, tensile, hardness, heat resistance, and modulus properties.

Accordingly, the molded polyurethane articles in accordance with the present invention find particular utility as auto parts such as car bumpers, body elements, panels, doors, engine hoods, skirts, air scoops, and the like. Further, the thermosetting nature of the present polymers results in their good high temperature performance characteristics which make them suitable for industrial elastomer applications where high temperature resistance is needed.

The following examples describe the manner and process of making and using the invention and set forth the best mode contemplated by the inventors of carrying out the invention but are not to be construed as limiting.

EXAMPLE 1

The following experiments describe the preparation of four polyisocyanate compositions in accordance with the present invention and two comparison polyisocyanate compositions not so in accordance. The ingredients and their proportions in parts by weight used in making these compositions are set forth in Table I below.

A vinylized adduct is first prepared as exemplified in composition 1 (Table 1) by adding 100 parts of Polyisocyanate I (defined in the footnotes to Table I) to a resin flask and heating the isocyanate to about 60° C. under nitrogen during stirring. A 3.31 parts proportion of 2-hydroxyethyl methacrylate is added dropwise and 3 drops of dibutyltin dilaurate catalyst. Stirring and heating at 60° C. is continued for 3 hours. Thus there is formed a vinylized adduct.

A 5 liter baffled resin flask is charged with 900 parts of Polyisocyanate III (defined in the footnotes to Table I) and 100 parts of the vinylized adduct prepared above. The flask is equipped with a dry-ice condenser, thermometer, mechanical stirrer, and an addition pump. The mixture is heated to 90° C. during rapid stirring (400 r.p.m.) under argon. In a separate container a monomer/initiator mixture is prepared by mixing 326.3 parts of acrylonitrile, 6.7 parts of acrylamide, and 13.3 parts of Vazo 67. A two percent proportion by weight of the monomer mixture is added to the hot stirring mixture of Polyisocyanate III and the vinylized adduct with heating (90° C.) and stirring continuing for 0.5 hour. The remaining portion of the monomer mixture is added via the addition pump over a 5 hour period at 90° C. Heating and stirring are continued for a further 2 hour period. A short path distillation apparatus is fitted to the flask which is subjected to 1.5 mm. of mercury pressure at 60° C. for 3 hours. Unreacted monomer is collected in the dry-ice trap: wt.=25.22 g. or about 7.4 percent by weight of the monomer charge.

Thus there is obtained a polyisocyanate composition 1 in accordance with the present invention having a viscosity of 9540 cps at 25° C. (average of two determination); isocyanate eq. wt.=194.

Similarly prepared are the polyisocyanate compositions 2 to 4 and comparison compositions 1 to 2 using the ingredients set forth in Table I. The compositions 2 to 4 are characterized by relatively low viscosities at 25° C. notwithstanding the polymer content of 25 percent by weight.

Comparatively, in comparison 1 wherein a higher proportion of 2-hydroxyethyl methacrylate is employed in the preparation of the vinylized adduct, the composition is characterized by far higher viscosity compared with compositions 1 to 4 of the invention even though monomer content is the same. Comparison 2 results in a solid product when a polyisocyanate having carbodiimide is employed for vinylized adduct formation.

A control composition is prepared identically to that described for composition 4 of the invention except that pure Polyisocyanate I is employed instead of the vinylized adduct in admixture with the Polyisocyanate III. There is obtained a non-uniform composition with a viscosity of 20,450 cps at 25° C. Accordingly, composition 4 represents a 3.8 fold improvement in viscosity at the same concentration of polymer.

TABLE I

|  | #1 | #2 | #3 | #4 | Comparison #1 | Comparison #2 |
|---|---|---|---|---|---|---|
| Vinylized Adduct: | | | | | | |
| Polyisocyanate I[1] | 100 | 100 | — | 100 | 100 | — |
| Polyisocyanate II[2] | — | — | 100 | — | — | — |
| Polyisocyanate III[3] | — | — | — | — | — | 100 |
| 2-Hydroxyethyl methacrylate | 3.31 | 6.63 | 6.62 | — | 13.25 | 6.63 |
| 2-Hydroxyethyl acrylate | — | — | — | 5.92 | — | — |
| Dibutyltin dilaurate | 3 drops | none | none | none | 3 drops | 3 drops |
| Compositions: | | | | | | |
| Polyisocyanate III | 900 | 900 | 900 | 900 | 900 | 900 |

TABLE I-continued

|  | #1 | #2 | #3 | #4 | Comparison #1 | Comparison #2 |
|---|---|---|---|---|---|---|
| Adduct | 100 | 100 | 100 | 100 | 100 | 100 |
| Acrylonitrile | 326.3 | 326.3 | 326.3 | 326.3 | 326.3 | 326.3 |
| Acrylamide | 6.7 | 6.7 | 6.7 | 6.7 | 6.7 | 6.7 |
| Vazo 67[4] | 13.3 | 13.3 | 13.3 | 13.3 | 13.3 | 13.3 |
| % Vinyl polymer | 25 | 25 | 25 | 25 | 25 | 25 |
| Viscosity (cps, 25° C.) | 9,540 | 5,900 | 11,000 | 5,410 | 50,300 | solid[6] |
| Recovered monomer (% of charge)[5] | 7.4 | 4.0 | 6.5 | 5.8 | — | 6.1 |
| Isocyanate eq. wt. | 194 | 191 | 192 | 194 | — | — |

Footnotes to TABLE I
[1]Polyisocyanate I: A polymethylene polyphenyl polyisocyanate mixture containing about 65 percent by weight of methylenebis(phenyl isocyanate) with the balance being isocyanates of functionality greater than 2 and wherein the MDI contains about 12 percent o,p'-isomer; isocyanate eq. wt. = about 131; viscosity = about 40 cps (250° C.).
[2]Polyisocyanate II: A polymethylene polyphenyl polyisocyanate mixture containing about 40 percent methylenebis(phenyl isocyanate) with the balance being isocyanates of functionality greater than 2; isocyanate eq. wt. = about 133; viscosity = about 180 cps (25° C.).
[3]Polyisocyanate III: A liquefied form of 4,4'-methylenebis(phenyl isocyanate) in which a portion of the isocyanate groups have been converted to carbodiimide groups; I.E. = about 143; viscosity = about 30 cps (25° C.).
[4]Vazo 67: A free radical initiating catalyst. 2,2'-azobis(2-methylbutyro)nitrile supplied by E. I. duPont de Nemours & Co.
[5]Recovered unreacted monomer as weight % of the initial charge of acrylonitrile and acrylamide combined.
[6]Not only was comparison 2 solid but the vinylized adduct gelled after standing one day.

EXAMPLE 2

Using the same ingredients and apparatus as described in composition 4 of Table I above but at double the proportions, a polyisocyanate dispersion composition in accordance with the present invention is prepared as follows.

The 5 liter baffled flask is charged with 1800 parts of Polyisocyanate III (defined in Table I), 200 parts of the vinylized adduct and heated to 90° C. A 2 percent by weight portion of a monomer mixture consisting of 652.6 parts of acrylonitrile, 13.4 parts of acrylamide, and 26.6 parts of Vazo 67 is added to the flask and stirring continued for 0.5 hour. Addition of the monomer mixture is begun via the addition pump at a rate such that over 1 hour about 150 ml. is added. At this point a 100 ml. portion of the unreacted monomer mixture is set aside while the remaining portion is mixed with 3.2 parts of iodine. The iodine/monomer mixture is added to the reaction flask still at 90° C. over a period of 2 hours. Then the final 100 ml. monomer mixture without iodine is added and the mixture heated for 3 hours. The cooled mixture is transferred to a flask equipped with a distillation apparatus where 22.46 g. (3.4 percent w/w) of unreacted monomer is removed at 60° C. under 1.5 mm. of mercury pressure.

The polyisocyanate composition has a viscosity of 2020 cps (25° C.); isocyanate eq. wt. = 193; and polymer content of about 26 percent by weight.

EXAMPLE 3

Using the same apparatus and ingredients in the proportions described in composition 4 of Table I except as noted below, a polyisocyanate dispersion composition in accordance with the present invention is prepared as follows.

The 5 liter flask is charged with the 900 parts of the Polyisocyanate III and 100 parts of the vinylized adduct described in composition 4 of Table I. The mixture is heated to 90° C. during stirring under argon. A 5 percent by weight proportion of a monomer mixture consisting of 319.6 parts of acrylonitrile, 6.7 parts of acrylamide, and 13.3 parts of Vazo 67 is added to the flask and the heating continued at 90° C. for 0.5 hour. Addition of a major portion of the monomer mixture is carried out slowly via the addition pump over a 4 hour period. When about a 100 ml. portion of the monomer mixture remains, 6.7 parts of divinyl benzene is added to it and slow addition continued. The mixture is heated for 2 hours after the addition at 90° C. under argon. Stirring at room temperature (about 20° C.) under argon is continued for about 48 hours. Using the short path distillation method described in Examples 1 and 2 above, 12.5 parts of unreacted monomer (3.75 percent by wt.) is recovered.

The polyisocyanate composition has a viscosity of 4670 cps (at 25° C.); isocyanate eq. wt. = 191.5; polymer content about 25 percent by weight.

EXAMPLE 4

Using the same apparatus and procedure set forth above and the ingredients in the proportions set forth below, a polyisocyanate dispersion composition in accordance with the present invention is prepared as follows.

The 5 liter flask is charged with 800 parts of Polyisocyanate III and 200 parts of the vinylized adduct described in composition 4 of Table I. The reaction mixture is heated to 90° C. under argon during rapid stirring. A 2 percent by weight proportion of a monomer mixture consisting of 300 parts of 2-ethylhexyl acrylate, 33 parts of hydroxymethyl acrylate and 3.3 parts of Vazo 67 is added to the flask. The mixture is heated for 0.5 hour. The remaining bulk of the monomer mixture is added over a one hour period to the flask. Heating and stirring is continued for 3 hours after addition is completed. Using the same vacuum stripping procedure described in the previous examples, 2.4 parts or 0.72 percent by weight of unreacted monomer mixture is recovered.

The polyisocyanate composition has a viscosity of 760 cps (at 25° C.); isocyanate eq. wt. = 202; polymer content is 25 percent by weight.

The hydrophobic nature imparted to the ethylhexyl acrylate monomer due to the ethylhexyl radical gives rise to anomalous behaviour compared with the lower molecular weight acrylates in the present polyisocyanate compositions. For example, when zero to less than a 10 percent by weight proportion of hydroxyethyl methacrylate is employed in combination with the 2-ethylhexyl acrylate monomer mixture, the final composition will separate into two layers comprising a liquid polymer layer and polyisocyanate layer. That is to say, the polymer cannot form a stable dispersion in the polyisocyanate. On the other hand, when the vinylized adduct is deleted and simply replaced by the corresponding weight of Polyisocyanate III and the hydroxyethyl acrylate left at 10 percent, a completely miscible composition is obtained having a viscosity of about 333 cps (25° C.). That is to say, the 2-ethylhexyl acrylate polymer readily dissolves in the polyisocyanate without forming a dispersion or a second layer.

EXAMPLE 5

Using the same apparatus and procedure set forth in the previous examples and the ingredients in the proportions set forth below, a polyisocyanate dispersion composition in accordance with the present invention is prepared as follows.

The 5 liter flask is charged with 1800 parts of Polyisocyanate 11 (described in Table I above) and 200 parts of the vinylized adduct described in composition 2 above in Table 1. The mixture is stirred and heated to 70° C. under a steady stream of nitrogen. A monomer mixture is prepared from 666 parts of vinylidene chloride which has been filtered through a 6"×1" silica gel column to remove inhibitor and 26.6 parts of Vazo 67. A two percent by weight portion of the monomer mixture is added to the flask followed by heating for 0.5 hour at 70° C. The remainder of the monomer mixture is added via an addition pump over a 2 hour period. This is followed by a 2 hour heating period at 70° C. and a further 2 hours at 75° C. Using the vacuum stripping process described in previous examples, 234.1 g. of unreacted vinylidene chloride is recovered.

The polyisocyanate composition has a viscosity of 830 cps (25° C.); isocyanate eq. wt.=158; polymer content is about 18 percent.

EXAMPLE 6

Using the same general procedure set forth in the previous examples and the ingredients in the proportions set forth below, a polyisocyanate dispersion composition in accordance with the present invention is prepared as follows.

A vinylized adduct is prepared by adding 500 parts of an 80/20 mixture of 2,4/2,6-toluene diisocyanate (TDI) to a resin flask under nitrogen and heated to 60° C. A 50.75 parts proportion of 2-hydroxyethyl methacrylate is added dropwise during stirring over a period of 0.5 hour. The stirring mixture is heated at 60° C. for 3 hours then allowed to cool.

The 5 liter resin flask is charged with 900 parts of 80/20 TDI isomer mixture and 100 parts of the vinylized TDI adduct prepared above. The contents are stirred under a blanket of nitrogen and heated to 85° C. A 2 percent by weight proportion of a monomer mixture consisting of 326.3 parts of acrylonitrile, 6.7 parts of acrylamide, and 13.3 parts of Vazo 67 is added to the flask and the reaction mixture heated for 0.5 hour. Two 75 ml. portions are separated from the monomer mixture while 1.6 parts of iodine is added to the remainder of the monomer mixture. One 75 ml. portion is added to the reaction mixture via addition pump over a 45 minute period at 85° C. This is followed by the bulk of the monomer mixture containing the iodine over 3.5 hours with the final 75 ml. portion added over 0.5 hour. The final reaction mixture is heated for 2 hours at 85° C. Vacuum stripping at 70° C. for 3 hours under 1.5 mm. of mercury pressure yields 6.6 parts of unreacted monomer.

The polyisocyanate composition has a viscosity of 325 cps (25° C.); isocyanate eq. wt.=119; and polymer content about 25 percent by weight.

EXAMPLE 7

Using the same general procedure set forth in the previous examples and the ingredients in the proportions set forth below, a polyisocyanate dispersion composition in accordance with the present invention is prepared as follows.

A vinylized adduct is prepared by adding dropwise 29.6 parts of 2-hydroxyethyl acrylate to 500 parts of 4,4'-methylenebis(cyclohexyl isocyanate) ($H_{12}MDI$) at 60° C. under argon and during stirring. When addition is completed, the reaction mixture is heated at 60° C. for a 2 hour period.

The 5 liter resin flask is charged with 900 parts of 4,4'-methylenebis(cyclohexyl isocyanate) and 100 parts of the vinylized $H_{12}MDI$ adduct prepared above. This mixture is heated to 90° C. under argon during stirring. A 2 percent by weight proportion of a monomer mixture consisting of 326.3 parts of acrylonitrile, 6.7 parts of acrylamide, and 13.3 parts of Vazo 67 is added to the flask and the reaction mixture heated at 90° C. for 0.5 hour. The remainder of the monomer mixture is added over a 5 hour period via an addition pump with the 90° C. heating being continued under argon for 2 hours followed by stirring overnight at ambient room temperature. Vacuum stripping using the short path distillation apparatus employed in previous examples at 60° C. under 1.5 mm. of mercury pressure yields 15.4 parts (4.6 percent) of unreacted monomer.

The polyisocyanate composition has a viscosity of 3040 cps (25° C.); isocyanate eq. wt.=170; and polymer content about 25 percent by weight.

Repetition of the above experiment except for increasing the proportions of the monomer mixture to 442.5 parts of acrylonitrile, 9.1 parts of acrylamide, and 13.0 parts of Vazo 67, provides a polyisocyanate composition of the invention containing 31 percent by weight of polymer; 8.2 parts of unreacted monomer is recovered by vacuum stripping; product viscosity =5110 cps (25° C.); isocyanate eq. wt.=196.

In a comparative experiment using the original monomer mixture proportions but in the absence of the 100 parts of vinylized $H_{12}MDI$ (1000 parts of $H_{12}MD$. used instead), a polyisocyanate composition not of the invention is obtained. While its original viscosity is low at 2410 cps (25° C.), after a few days storage it settles into 2 layers.

EXAMPLE 8

The following experiments describe the preparation of four (runs 1 to 4) molded polyurethanes in accordance with the present invention employing the polyisocyanate dispersion compositions in accordance with the present invention. A control polyurethane employing a plain liquefied polyisocyanate is also prepared. The ingredients in the proportions of parts by weight are set forth in Table II below.

The molded samples are prepared by a bench scale method wherein the polyisocyanate (component A of Table II) is combined with a premixed component B mixture comprising a polyether triol, ethylene glycol, and a catalytic amount of a polyurethane catalyst in the proportions set forth in Table 11. The ingredients are brought together in a plastic quart tub and vigorously stirred for 10 seconds using an electric drill press motor equipped with a Conn agitator rotating at about 1700 r.p.m. The reactive mixture is immediately poured into an 8"×8"×⅛" aluminum clam-shell mold coated with an external silicone mold release agent (MR-1000, supplied by Synair, Chattanooga, Tennesee). The mold temperature is 160° F. Demold time is 2 minutes and the polyurethane plaques are postcured at 250° F. for 1 hour. The samples are characterized by the physical properties set forth in Table II.

Run 1 with 15 percent polymer dispersion when compared with the control run having no polymer dispersion in the isocyanate shows improved tensile and flexural strength along with better flexural modulus. It will be noted that elongation, heat sag, and impact strength show a decrease in run 1. Increasing the polymer dispersion to 25 percent in run 2 results in even greater increase in tensile, flex modulus, and flex strength over the control. Correspondingly, greater decreases are noted in impact strength and heat resistance properties. The addition of the divinyl benzene component to the dispersion in run 3 does not lead to any real differences over run 2. The employment of iodine in the polymerization of the dispersion in the polyisocyanate (run 4) does not result in any real differences over runs 2 and 3. However, the use of iodine does result in lower polyisocyanate/dispersion viscosity.

TABLE II

| Run | Control | 1 | 2 | 3 | 4 |
|---|---|---|---|---|---|
| Ingredients (pts. by wt.) | | | | | |
| Component A: | | | | | |
| Polyisocyanate III[1] | 102 | — | — | — | — |
| Polyisocyanate 3a[2] | — | 115.2 | — | — | — |
| Polyisocyanate 4[3] | — | — | 138.7 | — | — |
| Polyisocyanate Ex. 3[4] | — | — | — | 136.6 | — |
| Polyisocyanate Ex. 2[5] | — | — | — | — | 138 |
| Polymer content (%) | 0 | 15 | 25 | 25 | 25 |
| Component B: | | | | | |
| Voranol 4815[6] | 100 | 100 | 100 | 100 | 100 |
| Ethylene glycol | 20 | 20 | 20 | 20 | 20 |
| Dibutyltin dilaurate | 0.1 | 0.1 | 0.1 | 0.1 | 0.1 |
| NCO index | 1.03 | 0.98 | 1.03 | 1.05 | 1.03 |
| Physical Properties | | | | | |
| Density (g./cc.) | 1.04 | 1.12 | 1.16 | 1.14 | 1.12 |
| Shore D Hardness | 51 | 57 | 62 | 62 | 62 |
| Tensile Str. (psi) | 2230 | 2480 | 3420 | 3030 | 3080 |
| Elongation (%) | 310 | 190 | 210 | 210 | 240 |
| Flexural Mod. (psi) | 25,520 | 39,530 | 45,570 | 48,060 | 44,870 |
| Flexural Str. (psi) | 1580 | 2170 | 2570 | 2580 | 2500 |
| Heat Sag[7] 250° F./1 hr. (inches) | 0.85 | 0.95 | 1.30 | 0.79 | 0.71 |
| Notched Izod Impact[8] ft.-lbs./in. | 7.44 | 6.87 | 3.33 | 2.81 | 2.81 |

Footnotes to TABLE II
[1]Polyisocyanate III: Described in Table I of Example 1.
[2]Polyisocyanate 3a: A polyisocyanate composition of this invention prepared identically to Composition 3 described in Table I, Example 1 except that the monomer mixture employed with the 900 parts of Polyisocyanate III and 100 parts of vinylized adduct consists of 165 parts of acrylonitrile, 3.52 parts of acrylamide, and 11.76 parts of Vazo 67 which results in a polymer content of 15 percent by weight; viscosity = 1705 cps (25° C.); isocyanate eq. wt. = 171.
[3]Polyisocyanate 4: Described in Table I, Example 1.
[4]Polyisocyanate Ex. 3: The composition described in Example 3 above.
[5]Polyisocyanate Ex. 2: The composition described in Example 2 above.
[6]Voranol 4815: A polyethyleneoxy-polypropyleneoxy triol; OH eq. wt. = about 2000; supplied by the Dow Chemical Company.
[7]Heat Sag: This determination measures in inches the amount that a 1 inch wide sample (about ⅛ inch thick) with a 6" unsupported overhang droops under its own weight when held at one end in a horizontal position under the specified conditions of time and temperature.
[8]Notched Izod Impact: Determined in accordance with ASTM Test Method D-256-56.

We claim:
1. In a liquid polymer/polyisocyanate composition prepared by the in-situ polymerization of at least one ethylenically unsaturated monomer in an organic polyisocyanate, the improvement which comprises carrying out said in-situ polymerization in the presence of a minor amount of an adduct prepared by the reaction of an excess of a carbodiimide-free organic polyisocyanate and a hydroxyl containing ethylenically unsaturated monomer.

2. A composition according to claim 1 wherein said adduct comprises from about 2 to about 25 percent by weight thereof.

3. A composition according to claim 1 wherein said adduct is prepared by the reaction of (a) said carbodiimide-free organic polyisocyanate and (b) from about 0.01 to about 0.2 equivalent per equivalent of said (a) of a hydroxyl containing ethylenically unsaturated monomer.

4. A composition according to claim 3 wherein said hydroxyl monomer (b) comprises a hydroxyalkyl (meth)acrylate.

5. A composition according to claim 1 wherein the carbodiimide-free polyisocyanate in said adduct is selected from the group consisting of aliphatic, aromatic, and cycloaliphatic polyisocyanates.

6. A composition according to claim 1 wherein the carbodiimide-free polyisocyanate in said adduct comprises an aromatic polyisocyanate.

7. A composition according to claim 1 wherein the polymer derived from said at least one unsaturated monomer comprises from about 10 to about 30 percent by weight of the composition.

8. A composition according to claim 1 wherein said in-situ polymerization is carried out in the presence of a free radical initiating catalyst and at a temperature of from about 25° C. to about 200° C.

9. A composition according to claim 1 wherein said organic polyisocyanate is an aromatic polyisocyanate.

10. A composition according to claim 1 wherein said at least one ethylenically unsaturated monomer is selected from the group consisting of (meth)acrylonitrile, (meth)acrylic monomers, vinyl halides, and mixtures thereof.

11. A composition according to claim 10 wherein said monomer comprises a mixture of a (meth)acrylonitrile and a (meth)acrylic monomer.

12. A composition according to claim 10 wherein said monomer is a mixture of an acrylic monomer and a minor amount of a hydroxyalkyl acrylate.

13. A composition according to claim 10 wherein said monomer is a vinyl halide.

14. A liquid polymer/polyisocyanate composition comprising the product of polymerizing in-situ in an aromatic polyisocyanate at least one ethylenically unsaturated monomer selected from the group consisting of a (meth)acrylonitrile, (meth)acrylic monomers, vinyl halides, and mixtures thereof at a temperature of from about 25° C. to about 200° C. in the presence of both a free radical initiating catalyst and from about 2 to about 25 percent by weight of the total composition of an adduct prepared by the reaction of (a) a carbodiimide-free aromatic polyisocyanate, and (b) from about 0.01 to about 0.2 equivalent per equivalent of said polyisocyanate (a) of a hydroxyalkyl (meth)acrylate, and wherein the polymer derived from said at least one unsaturated monomer comprises from about 10 to about 30 percent by weight of said composition.

15. A composition according to claim 14 wherein the components of said adduct comprise (a) a polymethylene polyphenyl polyisocyanate and (b) 2-hydroxyethyl (meth)-acrylate.

16. A composition according to claim 15 wherein said aromatic polyisocyanate is a carbodiimide containing methylenebis(phenyl isocyanate).

17. A composition according to claim 16 wherein said ethylenically unsaturated monomer comprises a major proportion of acrylonitrile and a minor proportion of acrylamide and said in-situ polymerization was carried out in the additional presence of a catalytic amount of iodine.

18. A composition according to claim 16 wherein said ethylenically unsaturated monomer comprises a mixture of 2-ethylhexyl acrylate and at least 10 percent by weight of 2-hydroxyethyl acrylate.

19. A composition according to claim 15 wherein said aromatic polyisocyanate comprises a polymethylene polyphenyl polyisocyanate.

20. A composition according to claim 19 wherein said ethylenically unsaturated monomer comprises vinylidene chloride.

21. A process for the preparation of a liquid polymer/polyisocyanate composition by the in-situ polymerization of at least one ethylenically unsaturated monomer in an organic polyisocyanate said process characterized by carrying out said polymerization in the presence of a minor amount of an adduct prepared by the reaction of an excess of a carbodiimide-free organic polyisocyanate and a hydroxyl containing ethylenically unsaturated monomer.

22. A molded polyurethane polymer prepared from the reaction in a mold of a mixture comprising an organic polyol, an extender, and a liquid polymer/polyisocyanate composition in accordance with claim 1.

* * * * *